Oct. 21, 1952   J. B. LONG   2,614,686
GUARD FOR POWER-DRIVEN CONVEYERS
Filed July 12, 1950   4 Sheets-Sheet 1

INVENTOR.
John B. Long
BY Lancaster, Allwine & Rommel
ATTORNEYS.

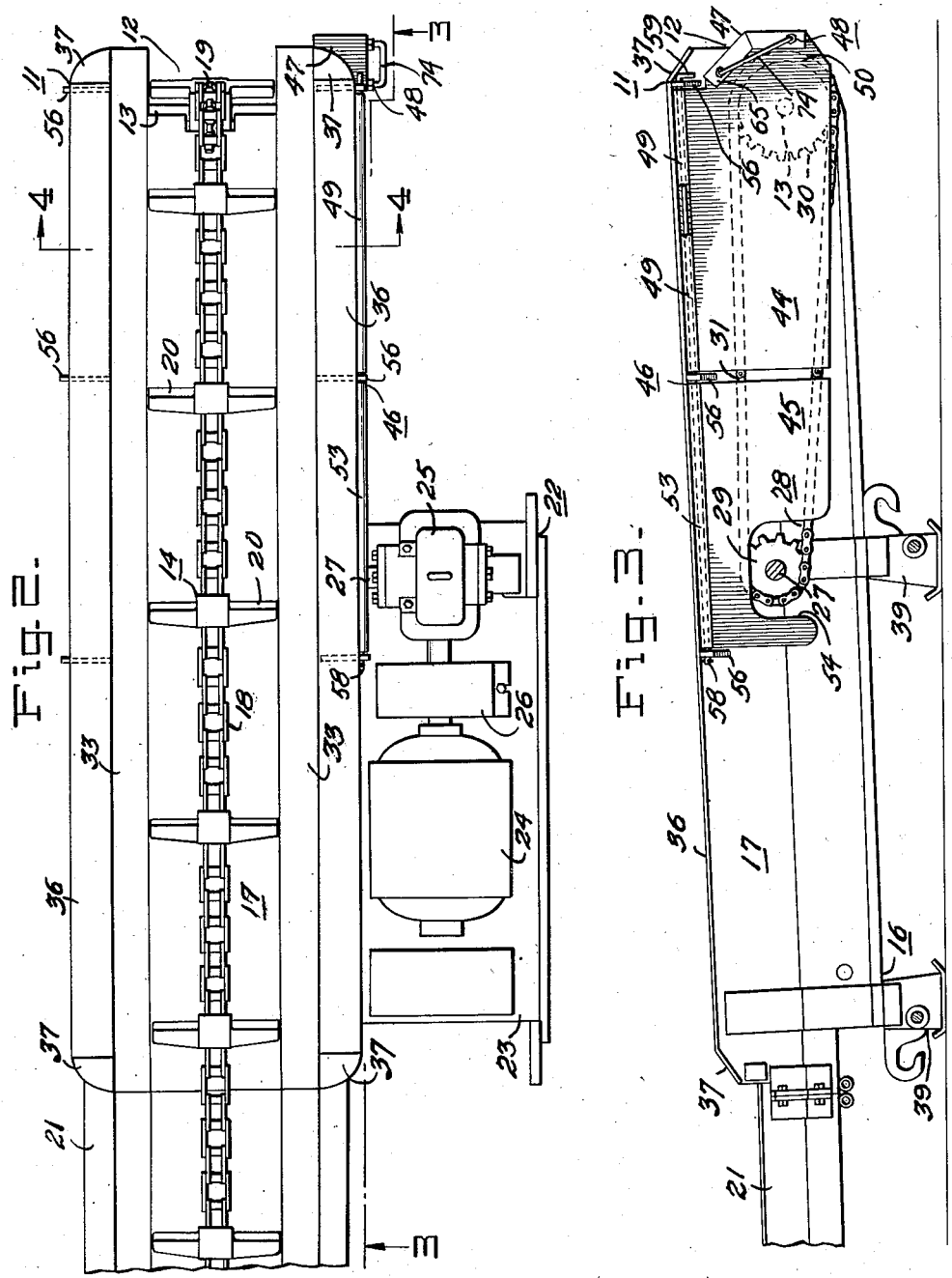

Oct. 21, 1952    J. B. LONG    2,614,686
GUARD FOR POWER-DRIVEN CONVEYERS
Filed July 12, 1950    4 Sheets-Sheet 3
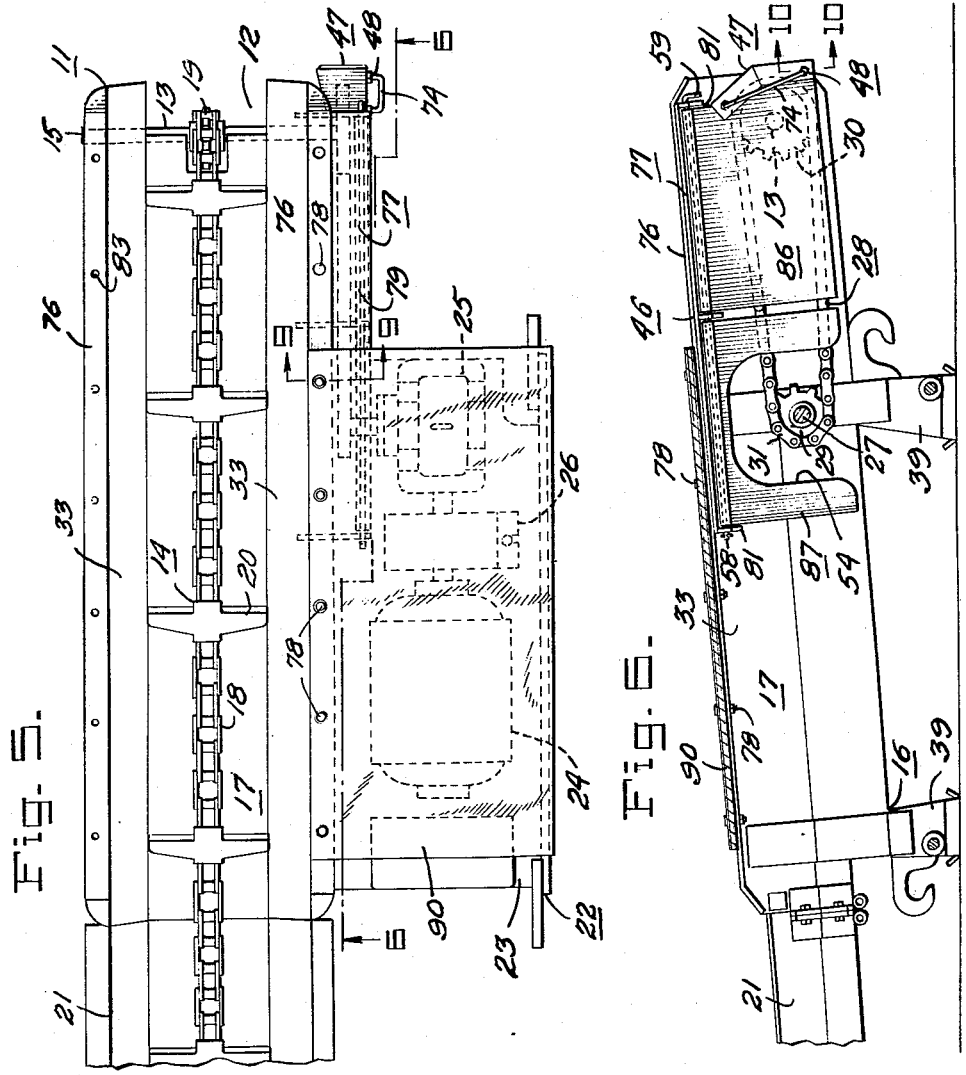
INVENTOR.
John B. Long
BY
ATTORNEYS.

Oct. 21, 1952   J. B. LONG   2,614,686
GUARD FOR POWER-DRIVEN CONVEYERS
Filed July 12, 1950   4 Sheets-Sheet 4
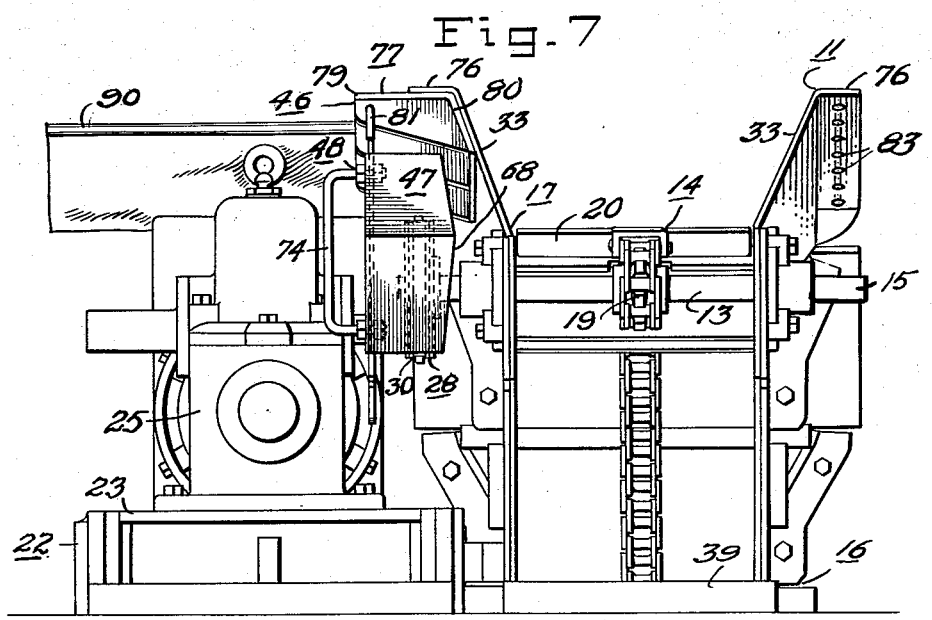
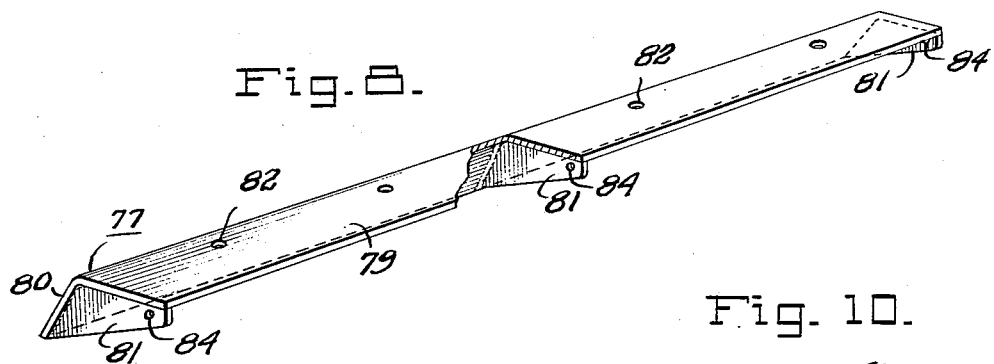
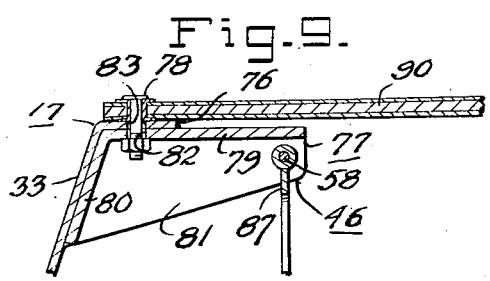
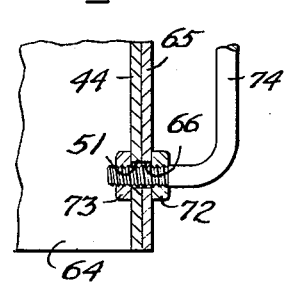
INVENTOR.
John B. Long
BY Lancaster, Allwine and Rommel
ATTORNEYS.

Patented Oct. 21, 1952

2,614,686

UNITED STATES PATENT OFFICE 2,614,686

GUARD FOR POWER-DRIVEN CONVEYERS

John B. Long, Fayetteville, W. Va.

Application July 12, 1950, Serial No. 173,431

9 Claims. (Cl. 198—203)

This invention relates to guards for use in association with power driven conveyors of the type usually used in mines, and more particularly to guards located at the delivery ends of the conveyors, which are often in close proximity to and above a transferring or gathering conveyor.

Power driven conveyors of this character each embody a head section including a driven or head shaft for operating a flexible endless material moving member such as sprocket chain and flights movable in a trough of the head section or a belt, and a power unit which may be selectively installed at either side of the head section. The power unit usually comprises a base, a prime mover, such as an electric motor, a flexible coupling, a speed-reducer, the slow-speed shaft of which is extended on both sides, so that the power unit may be installed at either side of the head section, suitable sprocket wheels on the slow-speed shaft of the power unit and driven shaft of the head section, and an endless sprocket chain trained about the sprocket wheels. The driven shaft is extended on both sides of the head section to permit of the installation of the power unit to either side of the head section. The head shaft is usually driven, by the head shaft sprocket through a shear pin to protect the equipment from excessive overloads.

In the past it has been the practice to rigidly install guards over and around moving parts of the power unit primarily to provide safety to workmen. These guards each comprise mainly an elongated cover plate above the sprocket wheels and associated chain, and depending end and side walls rigid with the cover plate, one end wall disposed in front of the head sprocket wheel, another end wall in back of the sprocket wheel on the slow-speed shaft of the speed reducer, a major side wall joining these end walls concealing the sprocket wheels and chain at the side of the power unit remote from the head section, and minor side walls joined to the end walls and disposed between the sprocket wheels and the head section. The major side wall of such conventional guard is usually provided with a slot open to its bottom, so that the guard can be lowered into place, the slot accommodating the slow-speed shaft of the speed reducer. A slide or swinging door is also usually provided in the major side wall so that the head shaft sprocket may be readily inspected and for the purpose of replacing fractured shear pins.

These types of conventional guards are rather heavy to lift, expensive to manufacture and two types must be provided, one for use when the power unit is installed at the left side of the tail section, and one for use when the former is installed at the right side of the power unit. Furthermore such conventional guards have the objectionable feature that they cannot yield when encountered by large lumps of material, such as coal, traveling on a gathering conveyor located beneath the conveyor equipped with such conventional guard. As a result, the large lump of material may be displaced so as to fall off the gathering conveyor or perhaps damaging the guard of either the delivery or receiving conveyor.

The principal objects of the present invention are to provide guards for conveyors of the character described which are low in cost of manufacture; easily installed; susceptible of application to either side of the head section, according to the location of the power unit with respect thereto; and having parts capable of yielding when a firm piece of material, such as that carried by a gathering conveyor, engages same, but returning to guarding relationship to the parts guarded when such material has passed the delivery zone of the conveyor equipped with the guard.

Another object is to render parts of the guard to function for dual purposes. For instance, in one embodiment of the invention the trough of the head section is provided with outwardly extending flanges along its upper margins, these flanges being made much wider than those of conventional head section troughs, so as to function as a part of the guard, these flanges each terminating at ends in downwardly and outwardly directed runner portions whereby the head section may be inverted to rest upon the flanges, for sliding it upon the mine floor or other surface, when moving it from place to place, the flanges acting similar to relatively wide sleigh runners, and the terminal end portions aiding in movement of the inverted head section over rough floors, or trash and other debris upon the floor.

In another embodiment of the invention the guard is susceptible of application to troughs of conventional head sections, the troughs being perforated for receiving parts of means to detachably connect the guard to the selected side of the head section.

Other objects and advantages will appear in the foregoing detailed description, taken in connection with the accompanying drawings, forming a part of this specification and in which drawings:

Fig. 1 is a fragmentary perspective view showing the delivery end of a conveyor of the character described, equipped with a guard according to one embodiment of the present invention, and a portion of a gathering conveyor beneath the delivery end and carrying a lump of coal which has swung parts of the guard to a position where they will permit onward travel of the lump in the gathering conveyor without likelihood of damage to the conveyors.

Fig. 2 is a plan view of the delivery end portion of the conveyor equipped with said embodiment of the invention.

Fig. 3 is a vertical sectional view on the line 3—3 of Fig. 2.

Fig. 5 is a plan view of the delivery end portion of a conveyor equipped with a modified embodiment of the invention.

Fig. 6 is a vertical sectional view on the line 6—6 of Fig. 5.

Fig. 7 is an enlarged end view of the assembly shown in Fig. 5, looking toward the delivery end.

Fig. 8 is a perspective view of a part of the guard shown in Figs. 5-7, a portion being broken away to disclose preferred details.

Figure 1:
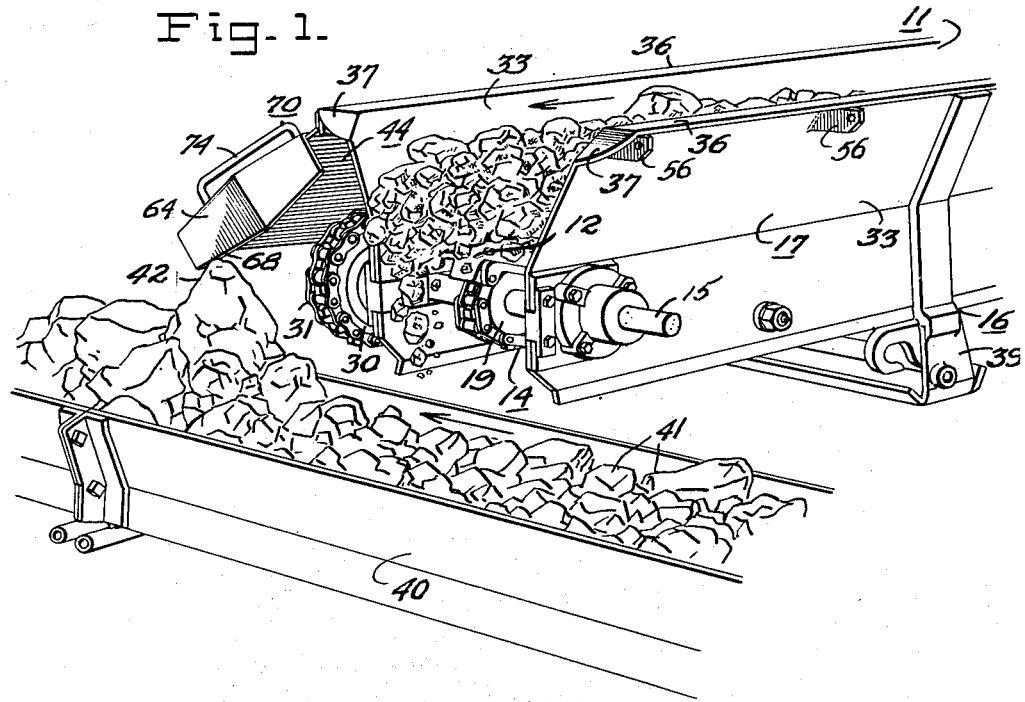

Figs. 9 and 10 are enlarged sectional views on the lines 9—9 and 10—10, of Figs. 5 and 6, respectively.

In the drawings I disclose a typical power driven conveyor of the type including an elongated head section 11 at the material delivery end 12 of which is located a transversely disposed head shaft 13 for imparting movement to a flexible, endless material moving member 14. In the example shown, the head shaft 13 has an extended portion 15 at each side of the head section, so that power may be delivered to either end of the shaft as hereinafter described. Also in the example shown, the head section 11 comprises a base 16 and a trough 17, the flexible, endless material moving member 14 being shown as comprising a sprocket chain 18, trained about a sprocket wheel 19 on the head shaft 13, and flights 20 the upper run of the member 14 traveling in the trough 17. To the head section 11 is shown a portion of a detachable intermediate conveyor section 21.

The drawings also disclose a typical form of power unit 22 comprising a base or skid 23 upon which is mounted a prime mover 24, such as an electric motor, operatively connected to a speed reducer 25 through a flexible coupling 26 the speed reducer including a slow-speed shaft 27 which usually extends from each side of the speed reducer so that the end portion thereof nearest the head section 11 may be used, according to the particular side of the head section along which the power unit is installed; and motion transmitting means 28 extending longitudinally of the head section 11 for imparting movement of the slow-speed shaft 27 to head shaft 13. Usually this motion transmitting means comprises a sprocket wheel 29 keyed on shaft 27, a sprocket wheel 30 keyed on shaft 13, usually by use of a shear pin not shown in the drawing, and a sprocket chain 31 trained about wheels 29 and 30.

Figure 4:
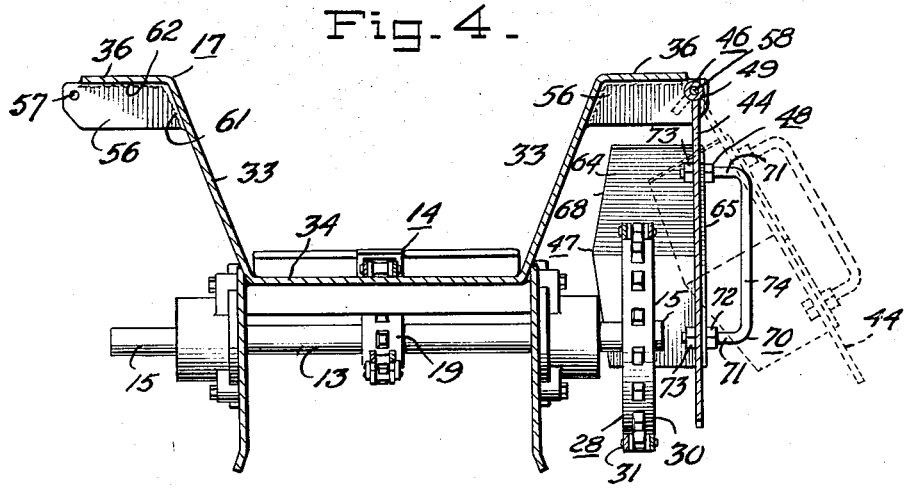
Fig. 4 is an enlarged transverse sectional view on the line 4—4 of Fig. 2.

As shown in Figs. 1-4, the trough 17 is made with side walls 33 in upwardly and outwardly diverging relation to its bottom 34, as is common practice, but to simplify the present invention and to provide means whereby the head section may be inverted, so that it may be slid upon the mine floor or other surface, I provide as a part of the trough 17, relatively wide, outwardly extending flange 36 along each wall 33, one of which flanges will be disposed over, but spaced from the motion transmitting means 28 as shown in Figs. 2 and 4. I also provide each flange 36, at each end thereof with downwardly and outwardly directed runner portions 37, which become upwardly and outwardly directed when the head section is inverted, to facilitate sliding of the unit, as described, and particularly over rough floors and trash or other debris on the floor. In this manner I utilize one of the flanges 36 to function like the top of the conventional guard commonly used and previously described, the flange also serving as an efficient skid or runner when the head section is inverted. The provision of the flanges 36 is particularly useful as a part of the head section disclosed and claimed in copending application for patent of Armistead R. Long and the present applicant, filed February 24, 1948, Serial No. 10,324, where the base includes pedestals 39 in spaced apart relation, as shown in Figs. 3 and 6 so the space between the pedestals is clear of obstructions for the purpose set forth in said copending application.

In Fig. 1 is disclosed a portion of a gathering conveyor 40 conveying lumps of material 41, including a relatively large lump 42 projecting upwardly a considerable distance above the mass of material being moved by conveyor 40. The arrows associated with Fig. 1 show the direction of movement of the materials on conveyors 11 and 40. It will be noted that the gathering conveyor 40 is below, and in material receiving relationship to the delivery end 12 of the conveyor 11, extending as it does, transversely thereof. It is large lumps of material such as is indicated at 42 that are frequently shoved off the gathering conveyor or may damage either the delivering or the gathering conveyor, as a result of encountering the conventional type of guard.

In the form of invention disclosed in Figs. 1-4 where the trough flanges 36 may form part of the guard, I preferably provide a first guard plate or curtain-like member 44, a second guard or curtain-like member 45, means 46 pendantly connecting the members 44 and 45 to the head section 11, a wheel guard 47 and means 48 detachably connecting the guard 47 to member 44.

The member 44, as shown more particularly in Fig. 3 is of elongated and polygonal shape; is disposed to confront a portion of the motion transmitting means 28 at its side away from the head section 11, and extends from adjacent the delivery end 12 of the head section and the connection of the motion transmitting means with the head shaft 13, rearwardly along the motion transmitting means. As a part of means 46 the upper margin of member 44 has a longitudinally extending hinge barrel 49 secured to or formed therewith. The forward end portion of the plate is preferably shaped to conform generally to the shape of the wheel 30 by having an extension 50, preferably provided with two apertures 51 one of which is shown in Fig. 10 for receiving parts of the preferred means 48.

The member 45 is also of elongated and polygonal shape; is disposed to normally align with member 44 and confront a portion of the motion transmitting means 28 at its side away from the head section 11; and extends from adjacent the member 44, rearwardly and beyond the wheel 29. The member 45 is also preferably provided with a hinge barrel 53 secured to or forming a part of its upper margin and is provided with a slot 54 open to its lower margin for accommodation of the slow-speed shaft 27.

The means 46 in addition to the hinge barrels 49 and 53, in the example shown comprises a plurality of brackets 56 secured to and extending outwardly from each side of the trough 17, each bracket being provided with an aperture 57, shown in Fig. 4, and a hinge rod 58 adapted to extend through the barrels 49 and 53 and the apertures in the brackets 56. The rod 58 may be provided with a handle 59 at one end portion to facilitate placing and removing it with respect to the barrels and brackets. It will be noted that the bores of the barrels are in the planes of their respective members 45 and 46, and that brackets 56 are provided on both sides of the trough 17, so that the members 45 and 46 may be transferred from one side of the head section 11 to the other side thereof. For instance, looking at Fig. 2 if one faces the delivery end 12 of the head section 11 the power unit 22 and the guard is on the left side of the head section, but if the power unit is transferred to the right side of the head section, the members 44 and 45 may be transferred to that side, so it is not necessary to provide different parts making up the guard assembly for left and right sides of the head section.

The brackets 56 may be welded, as at 61, to the inclined walls 33 of the trough 17 and welded, as at 62, to the undersides of the flanges 36, thus serving as a part of the guard assembly and strengthening the flanged portion of the head section. In other words, the brackets perform a dual function, as a part of means 46 and as a reinforcement for the flanges 36 which may act as skids when the head section is inverted.

Referring now to the wheel guard 47, it is preferably fabricated from sheet metal bent so as to be of angular cross section, providing a first flange portion 64 conforming generally to a segment of the periphery of wheel 30 and a second or attaching flange portion 65 provided with two apertures 66 for alignment with the apertures 51 in member 44, as is obvious from Fig. 10, these apertures being so located that when the means 48 attaches the wheel guard in place, no matter whether the latter is used as a guard on the left side of the head section 11 or the right side thereof, as previously described, the flange portion 44 will extend about and in spaced relation to a portion of the periphery of wheel 30 and the chain 31 trained thereabout, adjacent the delivery end 12 of the head section, as shown in Fig. 3. The flange portion 64 may be fabricated so that its free side margin 68 is of V-shape as shown in Figs. 1, 4 and 7, the uppermost portion of the marginal edge (when the wheel guard is in place on the member 44 and the latter is in a normal pendent position), conforming somewhat to the angle of inclination of the side wall 33 of trough 17.

The means 48, in the example shown comprises a U-shaped member 70, the arms 71 of which are screw threaded and nuts 72—73 on each of the threaded arms, which latter extend through the aligned apertures 51 and 66, as shown in Fig. 10. The nuts 72 are each turned tight on its respective arm when reaching the unthreaded portion and engage the outer face of flange portion 65, while the nuts 73 are turned tight against the inner face of guard member 44 to bind the U-shaped member 70 in place and secure the wheel guard 47 in its selected position as previously described. The bight portion 74 also serves as a handle whereby the guard member 44 may be conveniently lifted as indicated by dotted lines in Fig. 4, for inspection or oiling of the forward portion of the motion transmitting means 28, replacing of a fractured shear pin, not shown in the drawing, etc.

The modified form of the guard shown more particularly in Figs. 5–9 is particularly well adapted for use with a head section 11 of the general character previously described, but which is provided with a narrow, outwardly directed flange 76 along the upper margin of each trough wall 33 and not of sufficient width to afford in itself a guard above the motion transmitting means 28 of the power unit 22, and the guard may even be adapted for use with a head section having no flange as will be clear from the following description.

In this modification, instead of welding brackets to the trough of the head section for the support of the guard members in pendent position, I provide a detachable bracket assembly 77 which may be attached by bolts 78, or otherwise secured to the selected side of the head section, (according to the location of the power unit 22). As shown, the assembly preferably comprises an elongated body of angular cross-section providing a horizontal flange 79 and an inclined flange 80 for surface-to-surface contact with the trough wall 33; and a plurality of spaced apart brackets 81 welded or otherwise secured to the flanges 79 and 80. The flange 79 is provided with a plurality of apertures 82 for the reception of the shanks of bolts 78 which also extend through apertures 83 in the flange 76, and the brackets 81 are each provided with an aperture 84 for the reception of the hinge rod 58 of means 46, whereby first and second guard plates or curtain-like members 86 and 87, corresponding generally to members 44 and 45, respectively, shown in Fig. 3 are pendently supported by the head section 11 in guarding relationship to the motion transmitting means 28.

While the guard is primarily intended to provide safety for workmen, it functions also to prevent material falling laterally off the head section 11 from being caught in the motion transmitting means 28. As a further precaution there may be provided a guard member 90 secured to the side of the head section, as by bolts 78 extending over the power unit 22, as shown more particularly in Figs. 5 and 7. This guard member 90 may be made from a piece of rubberized fabric or from a section of conveyor belt. When the guard member 90 is provided, the guard member 87 may be dispensed with, since the guard member 86 affords the desired protection with respect to the forward portion of the motion transmitting means 28.

It will be noted that the bracket assembly 77 may be applied to the right side of the head section 11, looking toward Fig. 7, if the power unit 22 is transferred to or assembled with respect to that side of the head section, and the guard members 86 and 87 supported by the bracket assembly in such location, the position of the wheel guard 47 being reversed so as to afford protection in the zone of the sprocket wheel 30 and the sprocket chain 31 trained thereabout at the delivery end of the head section.

With respect to either embodiment of the invention, the pendently supported guard member 44 or 86 may be manually swung outwardly for access to the motion transmitting means 28, or may be swung outwardly by a large moving lump of material 42 or the gathering conveyor 40, as shown in Fig. 1, to permit its onward passage supported by such conveyor, without likelihood of its being pushed off the conveyor by the guard, the latter resuming its normal position, due to the force of gravity, after the lump has passed the zone of the conveyor head section 11.

I claim:

1. In a power driven conveyor of the type including an elongated head section at the material delivery end of which is located a transversely disposed head shaft, extending outwardly at each side of the head section, for imparting movement to a flexible, endless material moving member, and said head shaft driven from a power unit which may be selectively installed at either side of the head section, said power unit comprising a prime mover and motion transmitting means extending longitudinally of the head section and including a wheel secured to the selected outwardly extending end of the head shaft; the improvement which comprises a curtain-like guard member supported by the head section to confront said motion transmitting means at its side opposite the head section and extending from the delivery end of the head section, rearwardly along the motion transmitting means, a guard flange conforming generally to a segment of the periphery of said wheel, and means detachably connecting the guard flange to said curtain-like guard member in a position extending from that side of the plane of the latter, nearest said wheel, said guard flange extending about, but spaced from a portion of the periphery of the wheel adjacent the delivery end of the head section and interchangeable as to position with respect to the side of the curtain-like guard member when the motion transmitting means is to be guarded when the power unit is disposed at the opposite side of the head section.

2. In a power driven conveyor of the type including an elongated head section at the material delivery end of which is located a transversally disposed head shaft, extending outwardly at each side of the head section, for imparting movement to a flexible, endless material moving member, and said head shaft driven from a power unit which may be selectively installed at either side of the head section, said power unit comprising a prime mover and motion transmitting means extending longitudinally of the head section and including a wheel secured to the selected outwardly extending end of the head shaft; the improvement which comprises a curtain-like guard member supported by the head section to confront said motion transmitting means at its side opposite the head section and extending from the delivery end of the head section, rearwardly along the motion transmitting means, a wheel guard of angular cross section comprising a first flange conforming generally to a segment of the periphery of said wheel and a second flange in a plane normal to the plane of said first flange, and means detachably securing said second flange of said wheel guard to said curtain-like guard member with the first flange of the wheel guard extending from that side of the plane of the curtain-like guard member nearest said wheel, said first flange extending about, but spaced from a portion of the periphery of the wheel adjacent the delivery end of the head section, said wheel guard interchangeable as to position with respect to the side of the curtain-like guard member when the motion transmitting means is to be guarded when the power unit is disposed at the opposite side of the head section.

3. In a power driven conveyor of the type including an elongated head section at the material delivery end of which is located at transversally disposed head shaft, extending outwardly at each side of the head section, for imparting movement to a flexible, endless material moving member, and said head shaft driven from a power unit which may be selectively installed at either side of the head section, said power unit comprising a prime mover and motion transmitting means extending longitudinally of the head section and including a wheel secured to the selected outwardly extending end of the head shaft; the improvement which comprises a curtain-like guard member supported by the head section to confront said motion transmitting means at its side opposite the head section and extending from the delivery end of the head section, rearwardly along the motion transmitting means, said curtain-like guard member provided with a plurality of apertures adjacent its end nearest the delivery end of the head section, a wheel guard of angular cross-section comprising a first flange conforming generally to a segment of the periphery of said wheel, and a second flange in a plane normal to the plane of said first flange, said second flange provided with a plurality of apertures registering with the apertures of said curtain-like guard member, with the first flange of the wheel guard extending from that side of the plane of the curtain-like guard member nearest said wheel, said first flange extending about, but spaced from a portion of the periphery of the wheel adjacent the delivery end of the head section, and handle means detachably securing said wheel guard to said curtain-like guard member, said handle means comprising a U-shaped member, the arms of which are screw threaded and extend through said aligned apertures, and the bight portion of which serves as a handle, and nuts on said screw threaded arms, said wheel guard and handle means interchangeable as to position with respect to the side of the curtain-like guard member when the motion transmitting means is to be guarded when the power unit is disposed at the opposite side of the head section.

4. In a power driven conveyor of the type including an elongated head section at the material delivering end of which is located a transversally disposed head shaft, extending outwardly at each side of the head section, for imparting movement to a flexible endless material moving member the upper run of which is movable in a trough, and said head shaft driven from a power unit which may be selectively installed at either side of the head section, said power unit comprising a prime mover, a speed reducer, including a slow-speed shaft, operatively connected with said prime mover, a sprocket wheel on each said slow-speed shaft and head shaft and a sprocket chain trained about said wheels for imparting movement of the former to the latter, said wheels and chains located in a vertical plane in close proximity to the selected side of the head section; the improvement which comprises supporting brackets secured to and extending outwardly from each side of said trough, the brackets at each side being in spaced relation, a first curtain-like guard member and a second curtain-like guard member, said guard members disposed in end to end relationship and with their faces in confronting relation to said wheels and chain at their sides away from the head section, said first guard member extending from the delivery end of the head section, rearwardly along the outer face of the wheel on said head shaft and the runs of said chain, and the second guard member extending along the runs of the chain from said first guard member to beyond said wheel on the slow-speed shaft, said second guard member provided with a slot open at its bottom margin for accommodation of said slow-speed shaft, and means detachably connecting said curtain-like guard members to said brackets at the selected side of the head section.

5. In a power driven conveyor of the type including an elongated head section at the material delivering end of which is located a transversally disposed head shaft, extending outwardly at each side of the head section, for imparting movement to a flexible endless material moving member the upper run of which is movable in a trough, and said head shaft driven from a power unit which may be selectively installed at either side of the head section, said power unit comprising a prime mover, a speed reducer, including a slow-speed shaft, operatively connected with said prime mover, a sprocket wheel on each said slow-speed shaft and head shaft and a sprocket chain trained about said wheels for imparting movement of the former to the latter, said wheels and chains located in a vertical plane in close proximity to the selected side of the head section; the improvement which comprises supporting brackets secured to and extending outwardly from each side of said trough, the brackets at each side being in spaced relation, a first curtain-like guard member and a second curtain-like guard member, said guard members disposed in end to end relationship and with their faces in confronting relation to said wheels and chain at their sides away from the head section, said first guard member extending from the delivery end of the head section, rearwardly along the outer face of the wheel on said head shaft and the runs of said chain, and the second guard member extending along the runs of the chain from said first guard member to beyond said wheel on the slow-speed shaft, said second guard member provided with a slot open at its bottom margin for accommodation of said slow-speed shaft, means detachably connecting said curtain-like guard members to said brackets at the selected side of the head section, a guard flange conforming generally to a segment of the periphery of said sprocket wheel on the head shaft, and means detachably connecting the guard flange to said first curtain-like guard member in a position extending from that side of the plane of the latter, nearest said wheel said guard flange extending about, but spaced from a portion of the periphery of said wheel adjacent the delivery end of the head section and interchangeable as to position with respect to the side of the first curtain-like guard member when the power unit and first and second curtain-like guard members are disposed at the other side of the head section.

6. A power driven conveyor comprising an elongated head section including a trough provided with outwardly directed horizontal flanges along its upper margins, serving as runners for movement of the head section, when inverted, over a surface, a head shaft at the delivery end of the trough, and a flexible, endless material moving member operatively connected with said head shaft for movement thereby and having its upper run in said trough; a power unit laterally of said head section, including motion transmitting means operatively connected with said head shaft for imparting movement thereto, said motion transmitting means extending longitudinally of the head section under the adjacent flange of the trough; and a curtain-like guard member pendently supported by said last mentioned flange, said guard member confronting said motion transmitting means at its side away from the head section and extending from adjacent the delivery end of the trough, rearwardly along the motion transmitting means.

7. A power driven conveyor comprising an elongated head section including a trough provided with an outwardly directed, longitudinally extending, horizontal flange along at least one of its upper margins, a head shaft at the delivery end of the trough, and a flexible, endless material moving member operatively connected with said shaft for movement thereby and having its upper run in said trough; a power unit laterally of said head section, including motion transmitting means operatively connected with said shaft for imparting movement thereto, said motion transmitting means extending longitudinally of the head section, below said flange; an elongated guard plate; and means carried by said flange, pendently supporting said guard plate along an axis longitudinally of said plate, and nearest to and substantially paralleling the free longitudinal margin of said flange, and disposing said guard plate confronting said motion transmitting means at its side away from the head section.

8. A power driven conveyor comprising an elongated head section including a trough provided with outwardly directed, longitudinally extending, horizontal flanges along its upper margins, serving as runners for movement of the head section over a surface when the head section is inverted, a head shaft at the delivery end of the trough, and a flexible, endless material moving member operatively connected with said shaft for movement thereby and having its upper run in said trough; a power unit alongside of said head section, including motion transmitting means operatively connected with said shaft for imparting movement thereto, said motion transmitting means extending longitudinally of the head section, below one of said flanges; an elongated guard plate; and support means connected to said last mentioned flange, pendently supporting said guard plate along an axis longitudinally of said plate, and nearest to and substantially paralleling the free longitudinal margin of said last mentioned flange, and disposing said guard plate confronting said motion transmitting means at its side away from the head section.

9. The power driven conveyor as specified in claim 8 in which the support means includes a bracket assembly detachably connected to said last mentioned flange and attachable to the other of said trough flanges when the power unit is transferred to a position along the other side of the head section with the motion transmitting means extending longitudinally of the head section below the flange of said last mentioned side.

JOHN B. LONG.

REFERENCES CITED

The following references are of record in the file of this patent:

UNITED STATES PATENTS

| Number | Name | Date |
|---|---|---|
| 2,168,622 | Levin | Aug. 8, 1939 |

OTHER REFERENCES

"Goodman Underground Chain Conveyors," Bulletin No. C-372 (received in Div. 4 March 9, 1939).